UNITED STATES PATENT OFFICE.

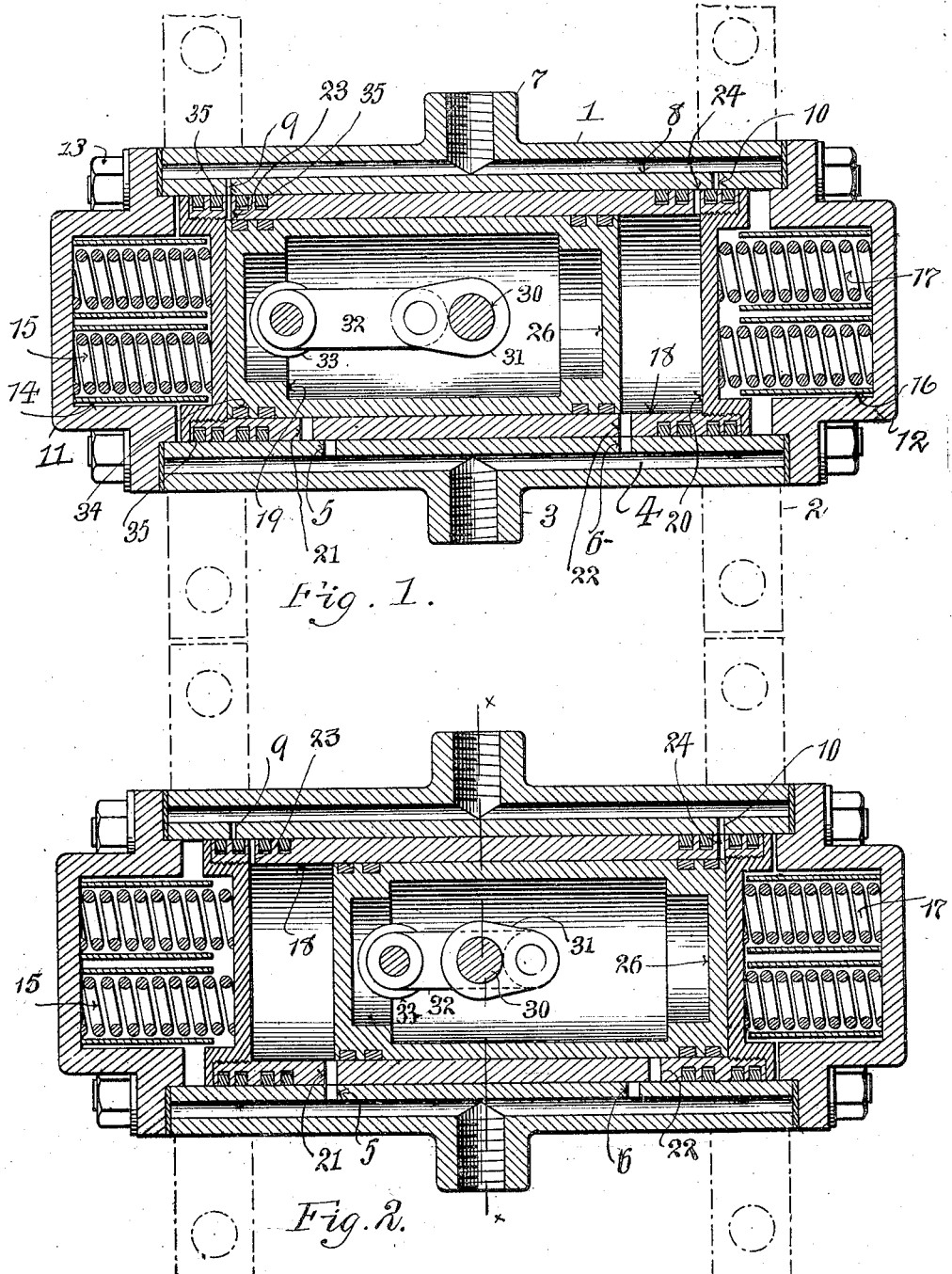

THOMAS E. MURRAY AND AUGUST W. H. GRIEPE, OF NEW YORK, N. Y.; SAID GRIEPE ASSIGNOR TO SAID MURRAY.

COMPRESSOR-PUMP.

1,103,986.   Specification of Letters Patent.   Patented July 21, 1914.

Application filed November 8, 1912. Serial No. 730,13ˉ

*To all whom it may concern:*

Be it known that we, THOMAS E. MURRAY and AUGUST W. H. GRIEPE, citizens of the United States, residing at New York, in the county of New York and State of New York, have invented a certain new and useful Improvement in Compressor-Pumps, of which the following is a specification.

The invention is a double-acting compressor pump, more especially intended for use in vapor compression refrigerating machines. It comprises a cylinder, a piston therein, a sleeve valve inclosing the piston, having inlet and outlet ports coöperating with inlet and outlet ports in the cylinder, and means for opposing a predetermined elastic resistance to the movement of the valve, these parts being so arranged and timed that during the forward stroke of the piston the sleeve valve is not moved against the resistance of the spring until the pressure of the fluid compressed within it by the piston overcomes the opposing elastic resistance. Then the valve is sufficiently moved to open an outlet for the compressed fluid, and an inlet through which a new charge is drawn into the sleeve valve behind the piston, which new charge on the return stroke of the piston becomes in like manner compressed.

Figure 3:
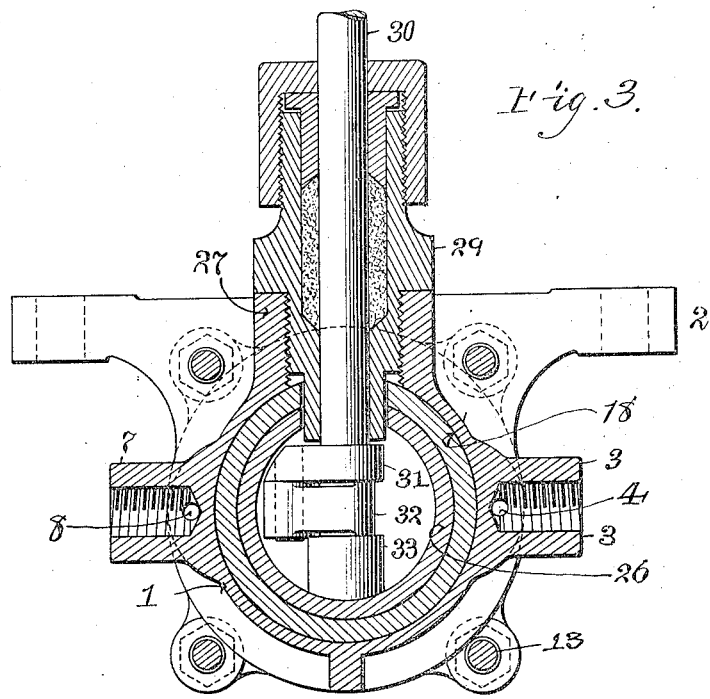
Figure 4:
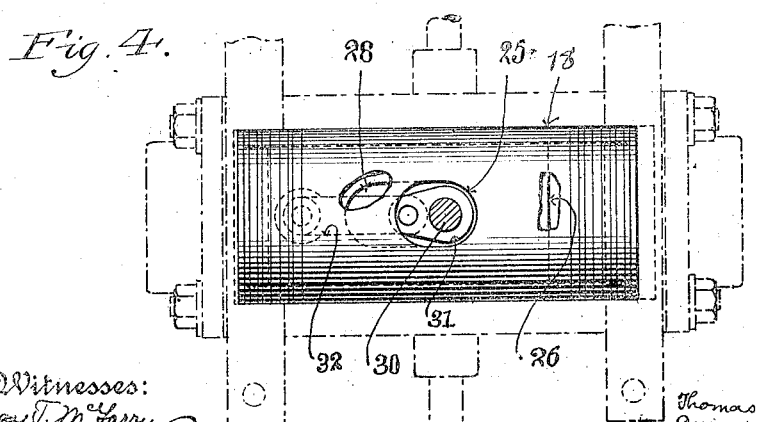

In the accompanying drawings—Figures 1 and 2 are horizontal sections of our compressor pump, respectively showing the piston at the left hand end, and at the right hand end of its stroke. Fig. 3 is a transverse vertical section on the line $x, x$ of Fig. 2. Fig. 4 is a top view of the sleeve valve, parts being broken away to show the opening in the piston for the insertion of the driving shaft and crank, and also the location of the right hand end of said piston when the crank arm is in the position shown.

Similar numbers of reference indicate like parts.

1 is the cylinder, provided with brackets 2, which may be secured upon any suitable supports. On one side of the cylinder is a tubular projection 3, internally threaded for the connection of the pipe leading from the source of fluid to be compressed. In the cylinder wall and communicating with tubular projection 3 is a passage 4. The inlet ports 5, 6 communicate with said passage. On the opposite side of cylinder 1 is a similar passage 8 communicating with the outlet ports 9, 10 and with internally threaded tubular projection 7, to which the delivery pipe may be attached.

The ends of the cylinder and of the passages 4 and 8 are closed by the heads 11, 12, secured by bolts 13. In head 11 are tubes 14, each tube containing a helical spring 15. In head 12 are tubes 16, each tube containing a helical spring 17. The resiliency of springs 17 is to be the same as that of springs 15. The tubes 14, 16 are rigidly secured in the heads in any suitable way.

Within the cylinder 1 is a sleeve valve 18, which at its ends is threaded to receive heads 19, 20. Said heads are recessed to receive the outer ends of helical springs 15 and 17. In valve 18 are inlet ports 21, 22, and outlet ports 23, 24. Also in the upper side of said valve is an elongated slot 25, Fig. 4.

The hollow cylindrical piston 26, which is placed within the sleeve valve 18, is everywhere closed except at the top, where there is an elongated slot 28, Fig. 4.

On the upper side of the cylinder 1 is an internally threaded projection 27, Fig. 3, which receives a stuffing-box 29, the lower portion of said box extending down through the slot 25 in the valve 18, and the slot 28 in piston 26, and entering said piston.

Passing through stuffing-box 29 is a driving shaft 30 which enters piston 26 and at its lower end carries a crank arm 31 which is pivoted to one end of a pitman 32, the other end of which pitman is pivoted to a lug 33 on the inner side of piston 26. A pair of packing rings 34 is provided at each end of the piston. At each end of the sleeve valve 18 are two pairs of similar packing rings 35, the members of each pair being disposed on opposite sides of the outlet ports 23, 24.

It is to be noted that the piston 26 is entirely inclosed within the sleeve valve 18, and reciprocates in said valve. The function of said valve is to control the inlet and outlet ports, as will now be described.

By any suitable means, the shaft 30 is rotated, and through the crank mechanism causes the piston 26 to reciprocate in the sleeve valve 18. Assuming that in Fig. 1 a charge of gas has been drawn into said valve on the right hand side of the piston through the registering inlet ports 6, 22, when the piston starts to the right, the sleeve valve moves with it in the same direction until equilibrium is established between springs 15 and 17. This movement will throw the ports 6, 22 and 9, 35 out of register. As the piston continues to move to the right, it compresses the gas in front of it, and finally overcomes the elastic resistance of springs 17. Then the sleeve valve 18 moves forward and brings the outlet ports 10, 24 into registry, so that the compressed gas can escape to passage 8 and outlet duct 7. At the same time, said valve brings the inlet ports 5, 21 on its left hand or rear side into alinement, so that a new charge of gas is drawn in. In Fig. 2, the compressed gas has just escaped from the outlet ports 10, 24, and the piston is about to begin its reverse stroke. The springs 17 then force the sleeve valve 18 to move to the left and follow the piston 26 for a certain distance, so closing the outlet ports 10, 24 and inlet ports 5, 21. The operation already described is repeated on the left hand side of the piston, until the resistance of springs 15 is overcome, when the outlet ports 9, 23 and inlet ports 6, 22 open, thus bringing the parts back to the position of Fig. 1.

If for any cause the pressure in the pump should rise above that provided for by the predetermined resilience of the springs, the sole effect is that the resistance of the springs is overcome at an earlier point in the stroke of the piston, and the outlet port becomes correspondingly opened to relieve the surplus pressure.

In assembling the machine, it is preferable to fill the piston with vaseline, thus insuring perfect lubrication of the crank mechanism. The movement of the sleeve valve 18 is very small, and may be but a small fraction of an inch, thus minimizing wear.

We claim:

1. A compressor pump, comprising a cylinder, a sleeve valve therein having inlet and outlet ports coöperating with inlet and outlet ports in said cylinder, a piston in said valve, means for reciprocating said piston, and means for opposing a predetermined resilient resistance to the movement of said sleeve valve by the fluid compressed therein by said piston.

2. A compressor pump, comprising a cylinder, a piston therein, a sleeve valve inclosing said piston, having inlet and outlet ports coöperating with inlet and outlet ports in said cylinder, means for reciprocating said piston, and means in said cylinder and interposed between the same and the ends of said sleeve valve for opposing a predetermined resilient resistance to the movement of said sleeve valve by the fluid compressed therein by said piston.

3. A compressor pump, comprising a cylinder, a piston therein, a sleeve valve inclosing said piston, having closed ends and, in its wall, outlet and inlet ports coöperating with outlet and inlet ports in the wall of said cylinder, means for reciprocating said piston, and a plurality of springs interposed between each end of said sleeve valve and said cylinder.

4. A compressor pump, comprising a cylinder, a sleeve valve therein, having a longitudinal slot and outlet and inlet ports coöperating with outlet and inlet ports in the wall of said cylinder, a hollow piston closed at both ends disposed within said valve and having a slot registering with said valve slot, mechanism within said piston for reciprocating the same, and a driving shaft for said mechanism entering said piston through said slots.

5. A compressor pump, comprising a cylinder, a sleeve valve therein, having a longitudinal slot and outlet and inlet ports coöperating with outlet and inlet ports in the wall of said cylinder, a hollow piston closed at both ends disposed within said valve and having a slot registering with said valve slot, mechanism within said piston for reciprocating the same, a stuffing-box seated in a wall of said cylinder and entering said piston through said slots, and a driving shaft for said reciprocating mechanism received in said stuffing-box.

6. A compressor pump, comprising a cylinder, a sleeve valve therein, having a longitudinal slot and outlet and inlet ports coöperating with outlet and inlet ports in the wall of said cylinder, a hollow piston closed at both ends disposed within said valve and having a slot registering with said valve slot, a rotary shaft entering said piston through said slots, a crank arm on said shaft disposed within said piston, and a pitman pivoted at its ends respectively to said piston and said crank arm.

In testimony whereof we have affixed our signatures in presence of two witnesses.

THOMAS E. MURRAY.
AUGUST W. H. GRIEPE.

Witnesses:
GERTRUDE T. PORTER,
MAY T. McGARRY.